United States Patent [19]

Teinturier et al.

[11] Patent Number: 5,726,387
[45] Date of Patent: Mar. 10, 1998

[54] DISTRIBUTION TRUNKING JOINED BY FISHPLATE MEANS AND SEAL MEMBERS, THE SEAL MEMBERS HAVE GROOVES FOR DIRECTING WATER OFF THE TRUNKING

[75] Inventors: Jean-Yves Teinturier, Longvic; Jean-Pierre Thierry, Arc-sur-Tille; Patrick Audiffret, Dijon, all of France

[73] Assignee: Schneider Electric SA, Boulogne-Billancourt, France

[21] Appl. No.: 451,988

[22] Filed: May 26, 1995

[30] Foreign Application Priority Data

Jun. 15, 1994 [FR] France ................. 94 07416

[51] Int. Cl.⁶ .................. H02G 3/02; H02G 3/04
[52] U.S. Cl. .................. 174/68.3; 52/220.7
[58] Field of Search .................. 174/70 C, 95, 174/97, 99 E, 99 R, 70 B, 71 B, 72 B, 88 B, 99 B, 68.2, 68.3; 361/775, 675; 439/210, 213; 52/220.7, 302.1, 726.1, 238.1, 279

[56] References Cited

U.S. PATENT DOCUMENTS 3,365,537 1/1968 Fehr, Jr. et al. .................. 174/88 B
3,647,937 3/1972 Jorgensen .................. 174/88 B
4,349,220 9/1982 Carroll et al. .
4,733,986 3/1988 Kenning et al. .................. 403/306

FOREIGN PATENT DOCUMENTS 1 533 676  6/1968  France .

OTHER PUBLICATIONS

Westinghouse Bus Duct Manual, pp. 10, 16–17, Feb. 1954.
Federal Pacific Bus Duct Catalog, pp. 4–5, 10–11, Aug. 1955.

Primary Examiner—Kristine L. Kincaid
Assistant Examiner—Kamand Cuneo
Attorney, Agent, or Firm—Oblon, Spivak, McClelland, Maier & Neustadt, P.C.

[57] ABSTRACT

An electrical distribution trunking formed from a plurality of longitudinal sections assembled together by mechanical fishplates and accommodating electrical conductors. The enclosure of the trunking has a longitudinal channel and a seal disposed at the ends of the sections on the top wall of the enclosure transversely to the longitudinal channel. The seal has an abutment resting in the longitudinal channel and a transverse conduit for removing water from the longitudinal channel.

9 Claims, 4 Drawing Sheets

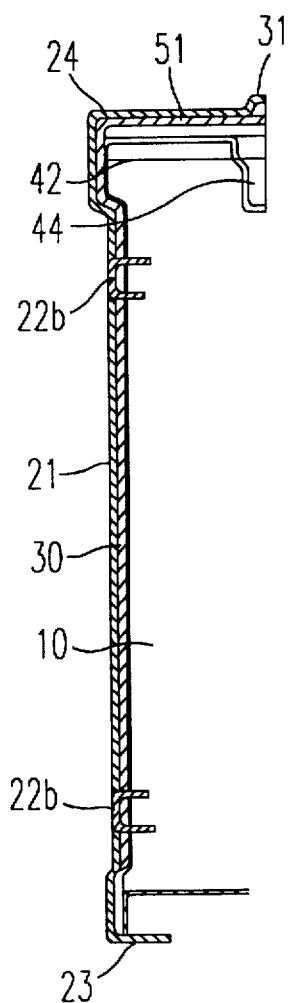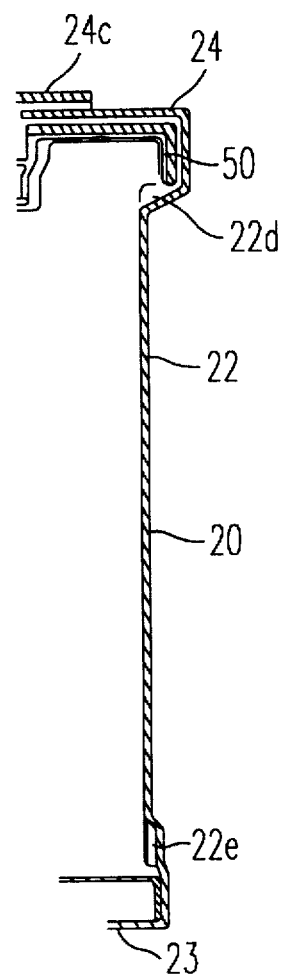
*FIG.3B*   *FIG.3A*

DISTRIBUTION TRUNKING JOINED BY FISHPLATE MEANS AND SEAL MEMBERS, THE SEAL MEMBERS HAVE GROOVES FOR DIRECTING WATER OFF THE TRUNKING

The present invention concerns electrical distribution trunking comprising a metal enclosure with top, bottom and side walls made up of a plurality of longitudinal sections assembled together at a mating plane by mechanical fishplate means and accommodating electrical conductors connected together by electrical connection means. The enclosure of the trunking has a longitudinal channel on its top wall.

The electrical conductors such as busbars or cables are connected together at the ends of the sections by connecting blocks accommodated in an opening in the enclosure; to protect the electrical conductors and the connection blocks from short-circuiting due to the ingress of water or any other liquid into the area in which two sections are butt-jointed by means of fishplates, either through their mating plane or through the aforementioned opening, fishplate and watertight clamping arrangements are required between the two sections. The fishplate means usually employed comprise two cover plates pressed against the side walls of the enclosure, but this type of device cannot seal the trunking sufficiently well.

The invention remedies the aforementioned drawback by a simple improvement to the sealing of the fishplate areas of trunking of the type described.

The trunking is characterised in that it comprises a sealing member disposed on the top wall of the enclosure at the ends of the sections, transversely to the longitudinal channel, and having an abutment resting in the longitudinal channel and a transverse water removal conduit which can communicate with the longitudinal channel. In this description the term "water" refers to any liquid which enters by virtue of flow or condensation.

The abutment advantageously has an opening discharging into the longitudinal channel of the enclosure and the transverse conduit communicates with the opening via at least one longitudinal conduit.

The mechanical fishplate means preferably comprise two half-shells each having a web and a top flange adapted to have their respective inside faces pressed against the side walls by transverse clamping means, to underlie the bottom wall and to overlie the top wall of the enclosure, the top flanges of the two half-shells being pressed together by longitudinal sealing means. The top flange of each half-shell advantageously comprises side flaps covering the sealing member. The web of each half-shell advantageously comprises vertical grooves the top end of which is near the transverse conduit of the sealing member and vertical seals at the edge of the grooves providing a lateral seal on either side of the opening in the enclosure. Each half-shell further comprises a bottom strip adapted to underlie the bottom wall of the enclosure and, in the web and above the bottom flange, a horizontal groove communicating with the aforementioned vertical grooves.

Finally, the sealing member comprises a bottom lip seal fastened to the abutment and adapted to be pressed against the top wall of the enclosure and a top lip seal fastened to a transverse wall adjacent the transverse conduit and adapted to be pressed against the inside face of the top flange and/or against the inside face of the web of the half-shells.

The following description with reference to the drawings indicates the features and advantages of the invention.

In the appended drawings:

FIGS. 3A and 3B are composite sectional views on section planes IIIA—IIIA and IIIB respectively in FIG. 2;

Figure 1:
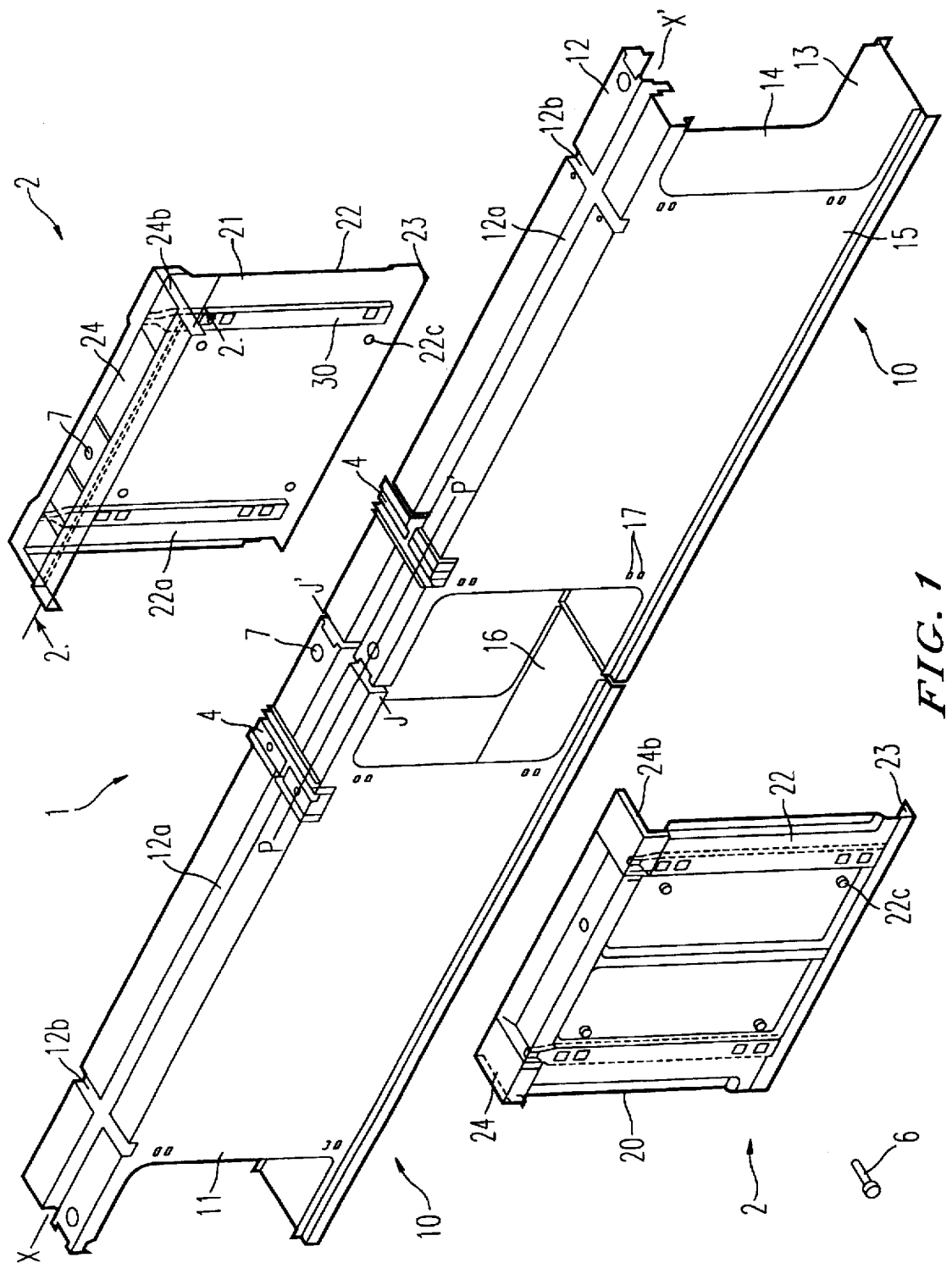
FIG. 1 is a perspective view of sealed trunking featuring fishplate joints.

The prefabricated electrical trunking 1 shown in FIG. 1 comprises a number of sections 10 the same length assembled together end-to-end. For simplicity only two sections are shown here. The trunking comprises a sheet metal enclosure 11 bent to a shape comprising a top wall 12, a bottom wall 13 and two sides walls 14 and 15; it is adapted to accommodate a plurality of electrical conductors such as busbars or cables, not shown in the figure.

At the level of the mating plane JJ' of two assembled sections, the side walls 14 and 15 have an opening 16 adapted to accommodate electrical connection means such as a connection block, not shown, interconnecting the electrical conductors of two sections. The top wall 12 has a longitudinal channel 12a running along the longitudinal axis XX' of the trunking and transverse channels 12b on either side of the mating plane JJ', set back from the ends of the opening 16 and adapted to receive a sealing member 4.

The sections 10 are assembled by mechanical fishplate means 2 which cover the openings 16. The fishplate means comprise two sheet metal half-shells 20 and 21 each bent to a shape comprising a web 22, a bottom flange 23 and a top flange 24.

Figure 2:
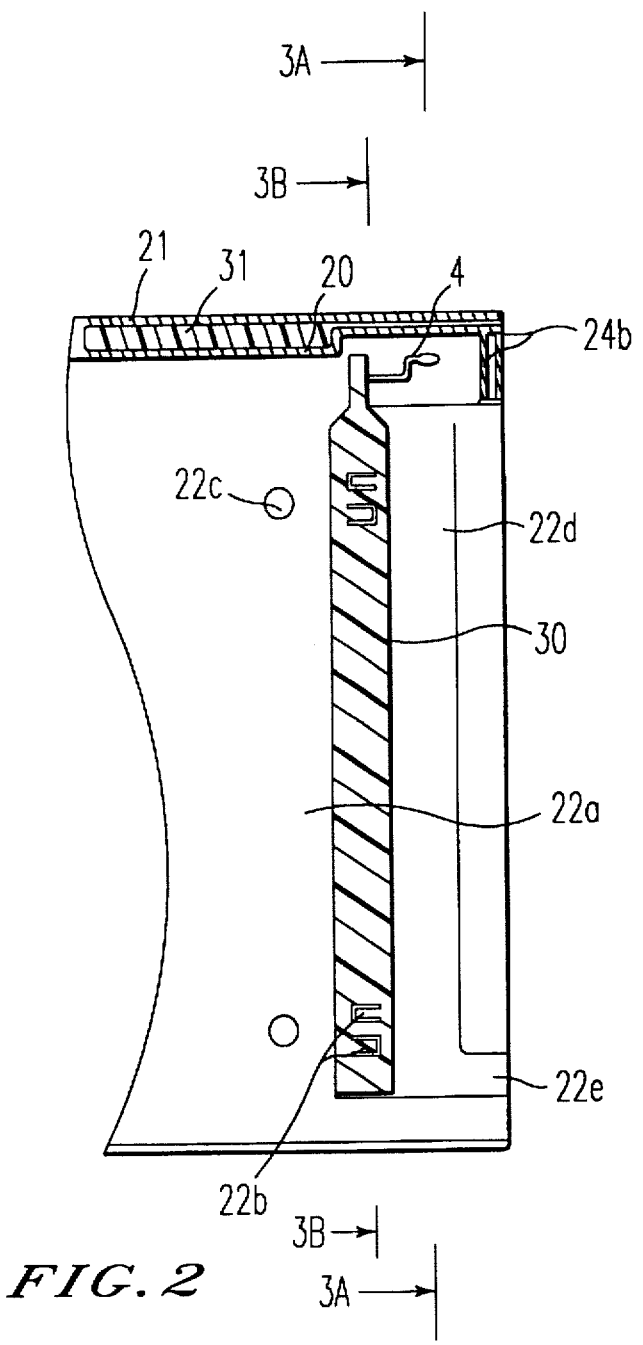
FIG. 2 is a view in section on the plane II—II in FIG. 1.
Figure 5:
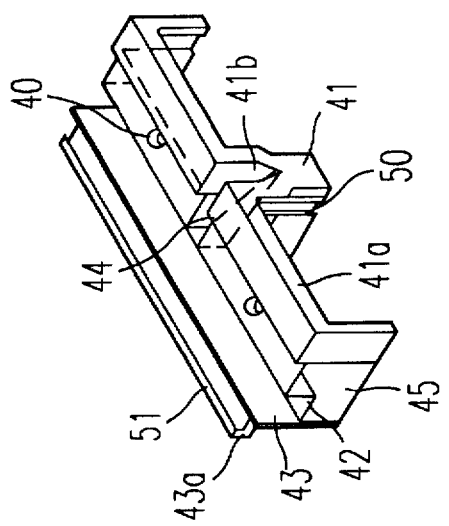
FIG. 5 is a perspective view of the sealing member.
Figure 4:
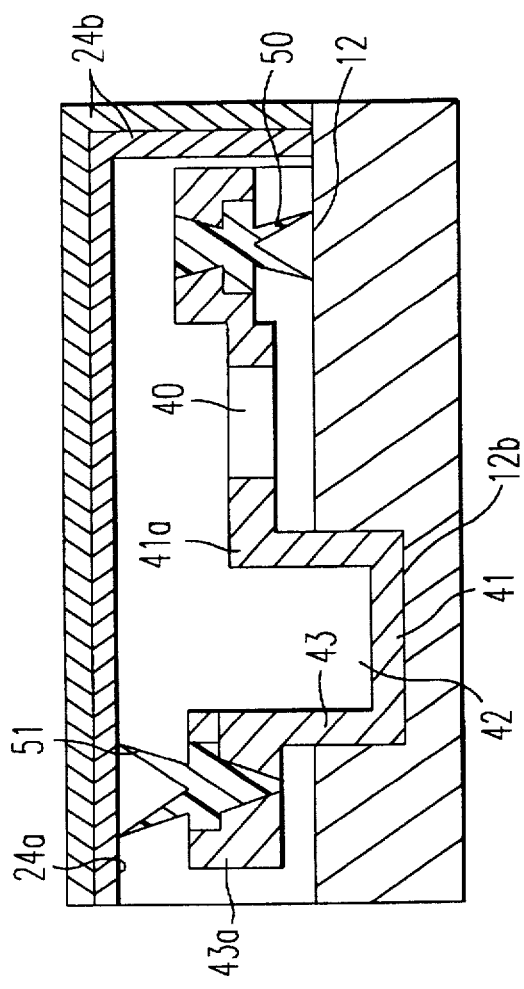
FIG. 4 is a view of the sealing member in the upper right hand part of FIG. 2 to a larger scale.

The web 22 has an inside face 22a adapted to be pressed against the side wall 14 or 15 of the trunking; this face carries locating lugs 22b (see FIG. 2) which can be inserted into appropriate holes 17 in the side walls and fixing holes 22c in which transverse clamping means 6 such as bolts can be inserted. The inside face also has, at its lateral ends, a vertical groove 22d merging perpendicularly at its lower end with a horizontal groove 22e facing towards the outside of the web. The groove 22d is flanked by a vertical seal 30 providing a seal on either side of the opening 16 when the two half-shells are fixed to the trunking.

The lower flange 23 is adapted to underlie the bottom wall 13 of the enclosure. The upper strip 24 has an inside face 24a adapted to overlie the top wall 12 of the trunking and side flaps 24b. The upper flange 24 of the half-shell 21 includes a ramp surface 24c which, when the half-shells are fixed to the trunking, overlies the upper flange of the half-shell 20 and is inclined so that water can run away from the mating area of the two flanges. This area is sealed by longitudinal sealing means 31 which preferably comprise a longitudinal seal disposed along all of the length of the inside face of the flange of the half-shell 21 at the start of the ramp 24c.

The sealing member 4 is moulded with a shape adapted to nest in the longitudinal channel 12a and the transverse channels 12b of the trunking; it has fixing holes 40 for riveting it to the top wall 12 of the enclosure.

The sealing member has an abutment 41 and a transverse conduit 42 for removing water. The middle of the abutment 41 rests on the bottom of the longitudinal channel 12a of the enclosure and its branches 41a are pressed against the top wall 12; it has an opening 41b leading into the longitudinal channel 12a of the enclosure. The transverse conduit 42 for removing water is delimited by a transverse wall 43 which is to the side of the mating plane JJ'.

Figure 6:
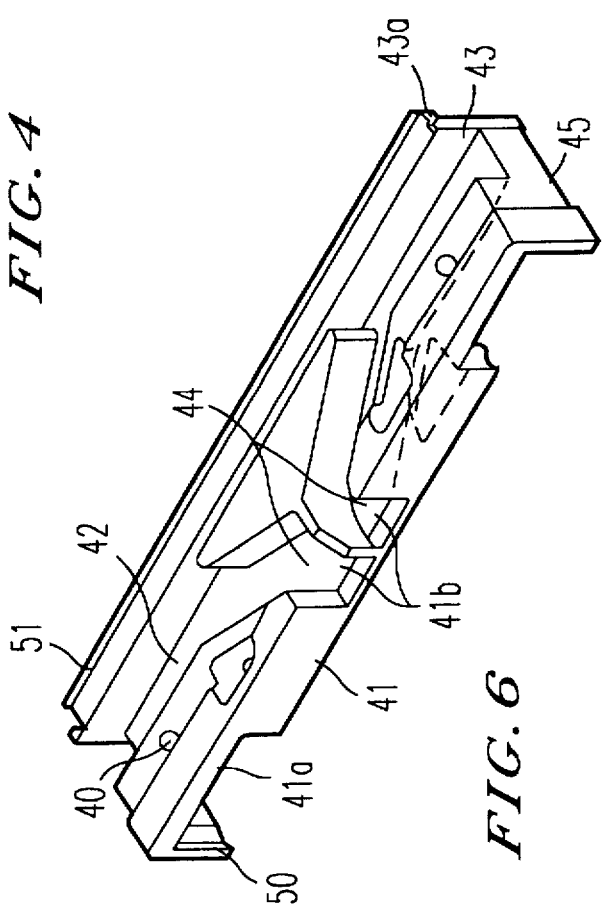
FIG. 6 is a perspective view of a sealing member.

The sealing member 4 further comprises a longitudinal conduit 44 communicating with the transverse conduit 42 and leading to the opening 41b of the abutment and rims 45 at the ends of the branches 41a of the abutment which are applied against the side walls 14 and 15 of the trunking to throw off water laterally. In the embodiment shown in FIG. 6 the member 4 has two longitudinal conduits 44.

Top and bottom elastomer lip seals 50 and 51 are fastened to the member 4, respectively on the lower edge of the abutment 41 and on an outer rim 43a of the transverse wall 43. The bottom lip seal 50 and top lip seal 51 act as transverse seals between the top wall 12 of the enclosure and the respective inside face 24a of the top flanges of the half-shells whose flaps 24b cover the member 4.

The operation of the device will now be described.

The members 4 are nested in the transverse channels 12b of each enclosure section and riveted to the top wall 12; the longitudinal conduit 44 of one member leads into the longitudinal channel 12a; the transverse conduit 42 leads to the edge of the side walls 14 and 15 and the bottom lip seal 50 is pressed against the top wall 12.

The two sections 10 are then assembled together by the mechanical fishplate means 2 mounted in the opening 16. The half-shell 20 is pressed against the trunking first, the locating lugs 22b cooperating with the holes 17 in the side wall for improved stiffness and the top flange 24 pressing on the wall 12 adjacent the top lip 51 of the member 4. The other half-shell 21 is similarly applied to the opposite side wall and the half-shells are fixed by means of the bolts 6; the top flange 24 presses on the wall 12 adjacent the top lip seal 51 of the member 4 and overlies the top flange 24 of the half-shell 20, being pressed against the latter at the location of the longitudinal seal 31, which is clamped by bolts cooperating with the opening 7 in the top flanges 24 and the wall 12.

If water finds its way into the longitudinal channel 12a it flows into the longitudinal conduit 44 and then into the transverse conduit 42 from which it flows along the side walls 14 and 15 of the enclosure in the vertical groove 22d and the horizontal groove 22e of the half-shells for removal to the outside of the fishplate member; the vertical seals prevent ingress of water into the openings 16.

We claim:

1. An electrical distribution trunking comprising:
   a metal enclosure having a top wall, a bottom wall, and side walls and formed from a plurality of longitudinal sections for accommodating electrical conductors interconnected by electrical connection means;
   a mechanical fishplate means for assembling said longitudinal sections together at a meeting plane;
   a longitudinal channel formed in said top wall;
   sealing members disposed at the ends of said longitudinal sections on said top wall and transversely to the longitudinal channel;
   each of said sealing members having an abutment resting in the longitudinal channel and a conduit transverse to the longitudinal channel and connected thereto for removing water, said sealing members acting to make the connection between the longitudinal sections and the fishplate liquidtight, wherein the abutment has an opening leading into the longitudinal channel, said opening communicating with the transverse conduit by way of at least one longitudinal conduit.

2. An electrical distribution trunking according to claim 1, wherein each of said sealing members comprise a bottom lip seal fastened to the abutment and pressed against the top wall.

3. An electrical distribution trunking according to claim 1, wherein the mechanical fishplate means comprises two half-shells each having a web and a top flange having an inside face pressed against the side walls by a transverse clamping means to underlie the bottom wall and to overlie the top wall of the enclosure, the top flanges of the two half-shells being pressed together by a longitudinal sealing means.

4. An electrical distribution trunking according to claim 3 wherein each sealing member comprises a top lip seal fastened to a transverse wall adjacent the transverse conduit and pressed against the inside face of the top flange, said top lip seal also being pressed against the inside face of the web of each of the half-shells.

5. An electrical distribution trunking according to claim 3 wherein the longitudinal sealing means comprises a longitudinal seal and wherein the top flange of each of said half-shells comprises side flaps covering the sealing members.

6. An electrical distribution trunking according to claim 3, wherein the web of each of said half-shells comprises vertical grooves, an upper end of which is near the transverse conduit of the sealing member and also comprises vertical seals at the edge of the grooves.

7. An electrical distribution trunking according to claim 6, wherein each of said half-shells comprises a bottom flange pressed against the bottom wall of the enclosure and on the web and above the bottom flange, a horizontal groove communicating with the vertical grooves.

8. An electrical distribution trunking according to claim 3 wherein each of said sealing members comprises a top lip seal fastened to a transverse wall adjacent the transverse conduit.

9. An electrical distribution trunking according to claim 3 wherein each of said sealing members comprises a top lip seal pressed against the inside face of the web of each of the half-shells.

* * * * *